F. P. CADY.
MOTOR CAR LIFTING TRUCK.
APPLICATION FILED FEB. 12, 1914.
1,186,543.
Patented June 13, 1916.
2 SHEETS—SHEET 1.
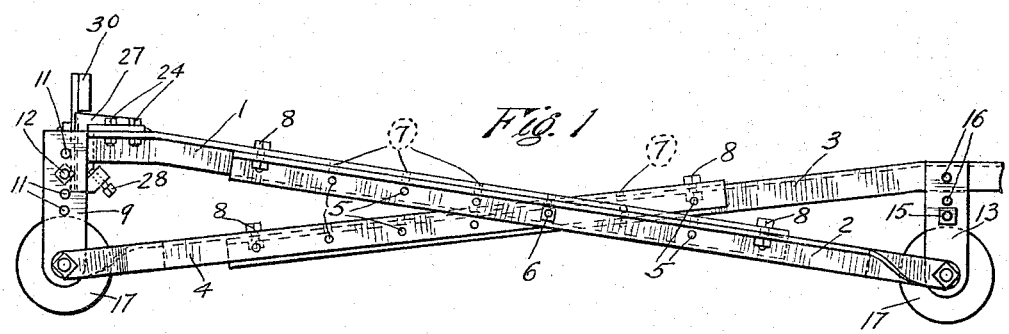
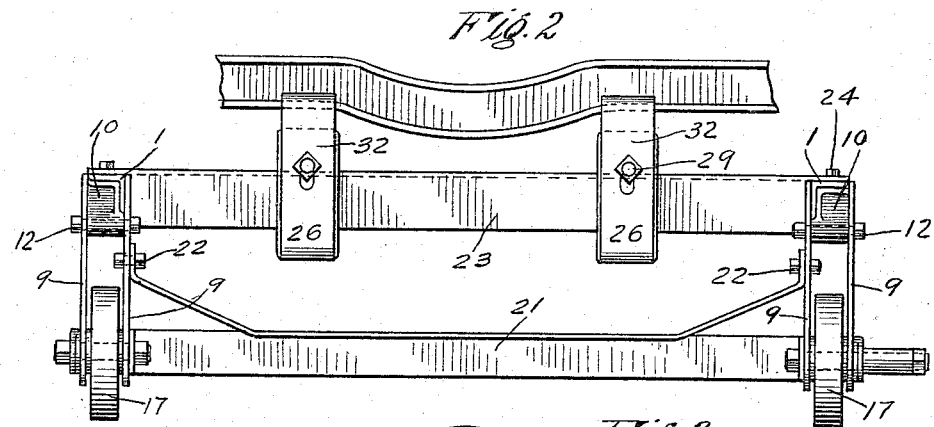
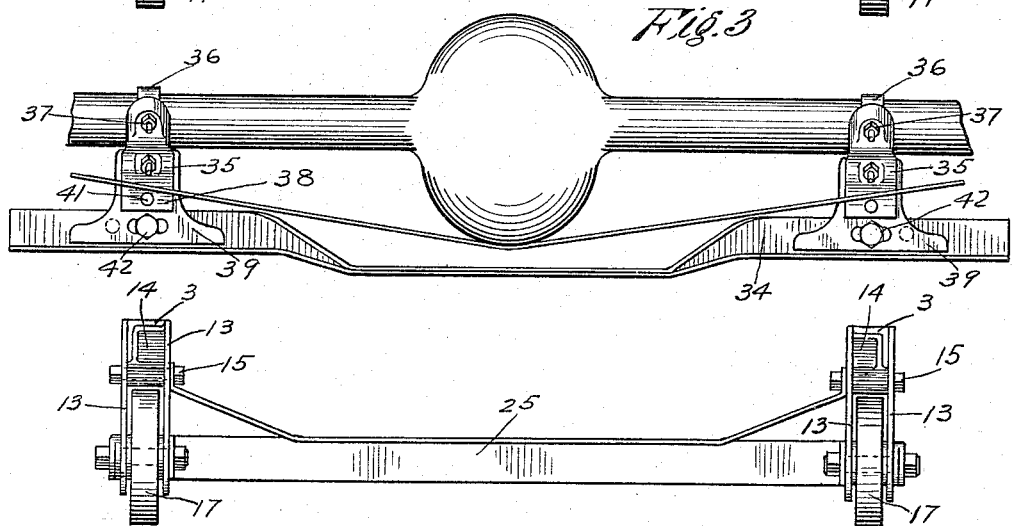
WITNESSES
INVENTOR
Frank P. Cady
by Wm. M. Cady
Att'y.

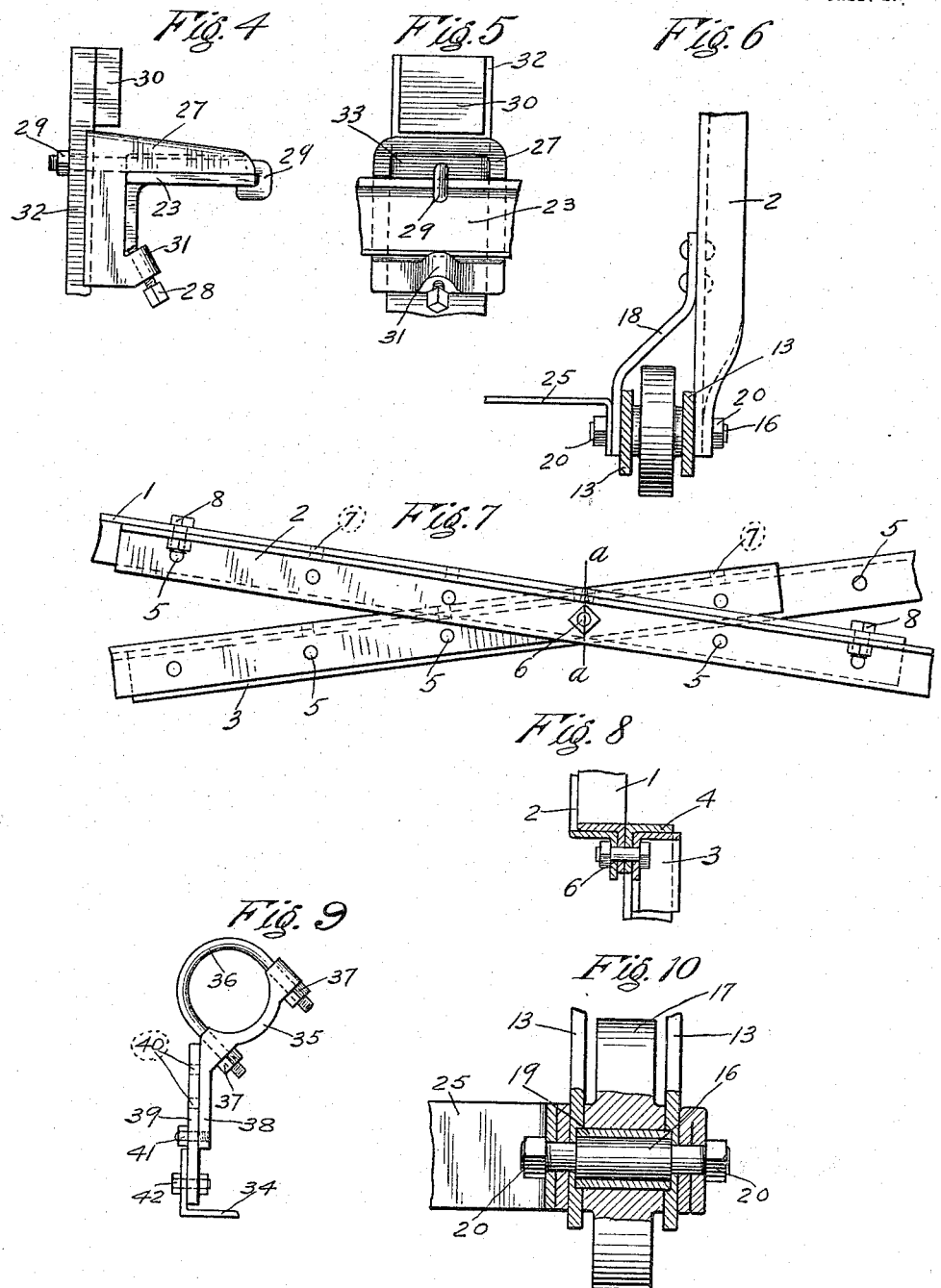

UNITED STATES PATENT OFFICE.

FRANK P. CADY, OF CLEVELAND, OHIO, ASSIGNOR TO THE CADY PATENT APPLIANCE COMPANY, OF CLEVELAND, OHIO, A CORPORATION OF OHIO.

MOTOR-CAR LIFTING-TRUCK.

1,186,543.

Specification of Letters Patent.

Patented June 13, 1916.

Application filed February 12, 1914. Serial No. 818,246.

*To all whom it may concern:*

Be it known that I, FRANK P. CADY, a citizen of the United States, residing at Cleveland, in the county of Cuyahoga and State of Ohio, have invented new and useful Improvements in Motor-Car Lifting-Trucks, of which the following is a specification.

This invention relates to lifting devices for motor cars, and is more particularly in the nature of an improvement on the construction shown in my prior pending application, Serial No. 781,107, filed July 25, 1913.

One object of my present invention is to provide a motor car lifting truck having means for adjusting the same to correspond with the particular wheel base of a given motor car.

Another object is to provide a motor car lifting device of simple construction and adapted to be cheaply manufactured.

The above and other objects and advantages will be apparent in the following more detailed description of the invention.

In the accompanying drawings; Figure 1 is a side elevation of a car lifting truck embodying my improvements; Fig. 2 a front elevation of said truck; Fig. 3 a rear elevation of the truck and the clip device for engaging the truck as applied to the rear axle of the motor car; Fig. 4 a side view in detail of one of the vehicle engaging stops of the truck; Fig. 5 a face view of said stop; Fig. 6 a detail view showing the application of a track wheel to the truck frame; Fig. 7 a side elevation of portions of the truck side members; Fig. 8 a section on the line *a—a* of Fig. 7; Fig. 9 a side view of the rear axle clip shown in Fig. 3; and Fig. 10 a detail view, partly in section, showing the preferred way of mounting the truck wheels on the truck frame.

Each side of the truck preferably comprises two centrally crossed members of angle iron having diverging ends, and in order to provide adjustability, one side member is made up of superimposed and longitudinally adjustable angles 1 and 2 and the other member of similar angles 3 and 4. In the vertical flanges of the angles are holes 5 spaced apart so that when the truck is adjusted to the desired length, a bolt 6 may be inserted in the registering holes 5 in each of the four angles at the central crossing point of the side members for securing said members together. In the horizontal flanges of the angles similarly spaced holes 7 are provided and bolts 8 are inserted in registering holes at the opposite ends of the angles for clamping the superimposed angles of each side member together. At the front end of the truck, the angles 1 and 4 at each side are spaced apart vertically by plates 9, and said plates are applied to opposite sides of a filling block 10 having a recess within which the end of the angle 1 is applied. A series of holes 11 in the plates 9 are provided which are adapted to register with a hole in the block 10 as the block is shifted vertically. When the parts are adjusted to the desired vertical height, a bolt 12 is inserted in the registering holes for clamping the parts together. At the rear end of the truck, the angles 2 and 3 are vertically spaced apart by plates 13, each upper angle 3 being secured in position by a filling block 14 secured between opposite plates 13 by means of a bolt 15. For the bolt 15, a series of holes 16 are provided in the plates 13, so that the vertical spacing may be adjusted, as in the case of the front end of the truck.

As shown in Figs. 6 and 10, at the lower ends of the angles 2 and 4, the horizontal flanges are bent flat against the vertical flanges and a hole is provided through the flanges for a bearing pin 16 of a truck wheel 17. The bearing pin 16 is supported on the opposite side of the wheel 17 by a reversely bent plate 18 which is secured to the angle iron preferably by rivets.

The uprights 13 are applied to the pin 16 at the respective inner sides of the plate 18 and the bent end of the angle 2 and are preferably provided with an annular recess surrounding the bearing hole of the pin 16, for the reception of the ends of a bushing 19. Each end of the pin 16 is provided with a threaded nut 20 for securely clamping the parts together. The truck wheels 17 at the front end of the truck are applied in the same manner as the rear wheels and therefore need not be further described.

The sides of the truck as above described are laterally connected together at the front and rear ends, the front connection comprising an angle 21 having the opposite end portions of the horizontal flange cut away from the vertical flange and bent upwardly. The extreme ends of the bent up portions are bent to fit against the sides of the uprights 9 and each end is secured to a corresponding upright by a bolt 22. The opposite ends of the vertical flanges are also bent at right angles to the flange and each is provided with an aperture, through which the corresponding pin 16 may be passed, so that the end member is secured in position by means of the pins 16 when the same are screwed home.

At the upper ends of the uprights 9 another end member 23 of angle iron is provided and this member has the opposite ends of the vertical flange cut away, so that the ends of the horizontal flange can rest on the upper faces of the side angles 1, said horizontal ends being secured to the angles 1 by means of bolts 24. Similarly, at the rear end of the truck, the sides are spaced apart by an end angle member 25, as shown in Fig. 3 of the drawings, the ends of the horizontal flange being cut away from the vertical flange and being bent in the same manner as in the case of the front end member 21.

At the rear end, the bolts 15 employed for clamping the uprights together may serve as a securing means for the bent ends of the angle flange when the vertical adjustment is such that the lower range of holes 16 are used, but if the bolt 15 is applied to any of the upper holes, then an additional hole is required for securing the flange to the uprights.

On the front end member 23 adjustable stops 26 are secured for engaging the front axle of the motor car in operating the truck. As shown more clearly in Figs. 4 and 5 of the drawings, each stop comprises an angle shaped casting 27 having the horizontal flange resting on top of the angle 23 and provided with a hook shaped projection 31 at the bottom of the vertical flange for hooking over the lower end of the vertical flange of the angle 23. Said projection is screw-threaded at an angle to the vertical for a set screw 28, so that by screwing up the set screw to bear against the lower end of the vertical flange of the member 23, the casting 27 may be secured in the desired position. The front face of the casting 27 is provided with a vertical recess for a sliding plate 32, said plate being secured to the casting by a bolt 29 having its inner end hooked so as to engage over the inner edge of the horizontal flange of the member 23, the casting 27 being provided with a recess 33 for said bolt. The slot in the plate 32 for the bolt 29 is extended vertically, so as to permit of vertical adjustment of the plate to correspond with the height of the front axle of the motor car and a bumper pad 30, preferably of rubber, is applied to the face of the plate 32 for easing the shock when the motor car axle is brought into engagement therewith.

By means of the arrangement above described, the stop may be adjusted laterally and vertically to suit a given motor car.

On the rear axle of the motor car is secured a member for engaging the rear portion of the truck, and, as shown in Figs. 3 and 9 of the drawings, said member preferably comprises a lateral, horizontally arranged angle 34 substantially filling the lateral space between the rear wheels of the car and having the vertical flange doubled over the horizontal flange at the central portion, said central portion being offset in a downward direction, so as to provide ample clearance for mechanism applied to the central portion of the motor car axle, as shown in Fig. 3.

The angle 34 is secured in position by means of clips, each comprising a casting 35 adapted to fit over part of the circumference of the axle and a U shaped strap 36 having screw threaded ends adapted to pass through apertures in the casting 35 and provided with nuts 37, so that the casting may be clamped to the axle by screwing of the nuts.

The casting 35 is provided with a downwardly projecting arm 38 to which is secured a vertically adjustable plate 39, said plate being provided with holes 40 adapted to register with a bolt 41 secured to the arm 38 according to the adjustment of the plate.

The angle 34 is secured to each plate 39 by means of a bolt 42, the plate being provided with elongated apertures for the bolts, to permit longitudinal adjustment of the angle 34. Said angle may also be provided with a plurality of holes for the bolts 42, so that a still greater range of adjustment may be secured.

By constructing the truck in the above described manner, a rigid, light weight device is provided and the arrangement of the side members permits adjustment of the truck length to correspond with the length of the motor car, while means are also provided for adjusting the height of the truck.

The feature of providing a device adapted to be attached to the vehicle axle for engaging the lifting truck is covered specifically in a divisional application, Serial No. 15,661, filed March 19, 1915.

Having now described my invention, what I claim as new and desire to secure by Letters Patent, is:—

1. A motor car lifting truck comprising crossed members connected at the point of intersection and forming the opposite sides of the truck, uprights connecting the adjacent ends of the crossed members, lateral members connecting the opposite sides of the truck, and truck wheels mounted at the four corners of the truck.

2. A motor car lifting truck comprising a frame having sides formed of crossed members and uprights for spacing said members apart, each member being composed of superimposed angles, adapted to be shifted one on the other and having a plurality of holes for the application of securing bolts in different positions of adjustment to thereby vary the length of the sides of the frame.

3. A motor car lifting truck comprising crossed side members pivotally secured together at the point of intersection and uprights connecting the adjacent ends of the side members and provided with a plurality of holes for bolts employed to secure the side members to the uprights, to thereby permit the vertical height of the truck to be varied.

4. A motor car lifting truck comprising crossed side members connected at the point of intersection, each member comprising superimposed angles slidable on each other and having a series of spaced holes for bolts to secure the angles together at different positions of adjustment, and uprights connecting the adjacent ends of the side members and formed of plates connected to the lower ends of the side members and having a plurality of holes for bolts adapted to secure the upper ends of the side members to the uprights at different points.

5. In a motor car lifting truck, the combination with a frame having end members, of a stop carried by one of the end members for engaging the axle of a motor car, said stop comprising a casting secured to the end member and a vertically movable stop plate mounted on said casting.

6. In a motor car lifting truck, the combination with a frame having end members, of a stop carried by one of the end members for engaging the axle of a motor car, said stop comprising a casting adjustably secured to the end member and having a vertical recess and a stop plate mounted in said recess and adapted to be vertically adjusted.

In testimony whereof I have hereunto set may hand.

FRANK P. CADY.

Witnesses:
W. W. KELLY,
W. H. KELLY.